(No Model.)

G. J. CLINE.
ROLLER AND BALL BEARING.

No. 524,705. Patented Aug. 21, 1894.

Witnesses
C. H. Raeder
N. F. Matthews

Inventor
George J. Cline
By Attorney James J. Shehy

UNITED STATES PATENT OFFICE.

GEORGE J. CLINE, OF GOSHEN, INDIANA.

ROLLER AND BALL BEARING.

SPECIFICATION forming part of Letters Patent No. 524,705, dated August 21, 1894.

Application filed May 16, 1894. Serial No. 511,425. (No model.)

*To all whom it may concern:*

Be it known that I, GEORGE J. CLINE, a citizen of the United States, residing at Goshen, in the county of Elkhart and State of Indiana, have invented certain new and useful Improvements in Roller and Ball Bearings; and I do declare the following to be a full, clear, and exact description of the invention, such as will enable others skilled in the art to which it appertains to make and use the same.

This invention relates to improvements in roller and ball bearings for spindles of axles as used upon vehicles, bicycles, railroad cars, and the like, and it has for its prime object to provide a bearing for such devices which will reduce the friction to a minimum and which will provide for a roller bearing against end thrust as well as circular movement.

A further object of the invention is to so construct and combine the parts that they may be produced at a comparatively small expense and quickly put together or taken apart and will permit of ready removal and replacement of any of the parts which might become impaired or injured.

Other objects and advantages will appear from the following description and claim when taken in connection with the annexed drawings, in which—

Figure 1:
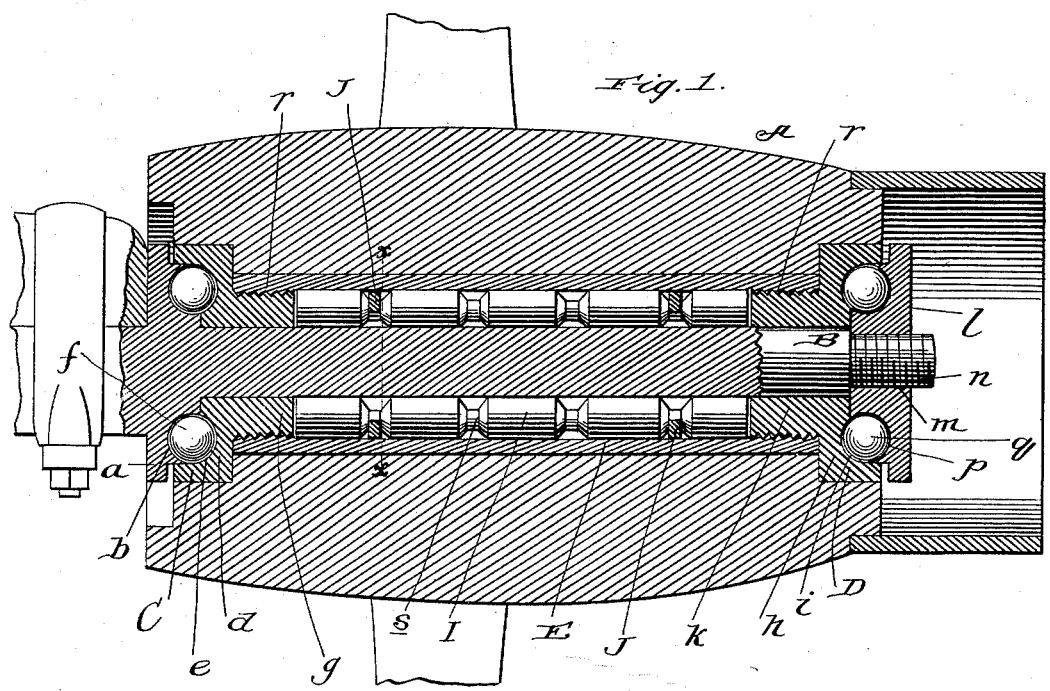
Figure 2:
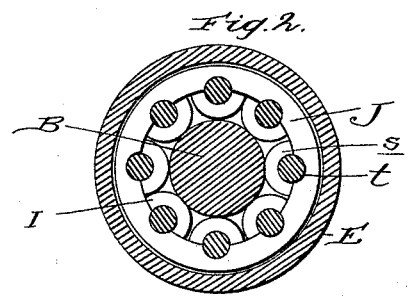

Figure 1, is a longitudinal, sectional view of a hub with my improvements applied, and Fig. 2, is a cross-sectional view of the improvements taken in the plane indicated by the dotted line $x, x$, on Fig. 1.

Referring by letter to said drawings: A, indicates a hub which is here illustrated as a hub of an ordinary wagon wheel, and B, indicates an axle spindle, both of which may be of any ordinary or approved construction; the spindle having an annular shoulder or collar $a$, and this collar is provided on its outer side with a conical, annular groove $b$, and comprises one half of an inner box C.

$d$, indicates the outer section of the inner box C. This section $d$, is provided on its outer side with an annular groove $e$, which is also designed to co-operate with the groove $b$, in receiving the balls $f$, which form a ring between the collar and the section $d$, of the inner box. This outer section is furthermore provided with an annular, externally-screw-threaded extension $g$, for a purpose which will presently appear.

D, indicates the outer box, which comprises an inner section $h$, which is a counterpart of the section $d$, of the inner box C, having the conical, annular groove $i$, in its outer side and the externally threaded extension $k$, on its inner side.

$l$, indicates the outer section of the outer box D, which serves the additional function of a nut. This outer section $l$, is provided with a central, screw-tapped aperture $m$, to engage the threads on the end $n$, of the spindle, and is provided on its inner side with an annular, curvilinear, or conical groove $p$, which co-operates with the groove $i$, of the inner section in receiving anti-friction balls $q$.

E, indicates a sleeve or tube which may be formed of steel or other suitable material, and is internally-threaded at opposite ends as shown at $r$, to engage the threaded extensions $g$, and $k$, of the inner box sections $d$, and $h$. By this construction it will be seen that the boxes may be adjusted upon the spindle and within the hub and that any end thrust of the wheel or axle will be taken up by the balls, and as the balls become worn in use, the bearing can be tightened by the manipulation of the sleeve and the nut $l$.

I, indicates rollers which are arranged longitudinally around the spindle between the end boxes and within the connecting sleeve. These rollers are of a peculiar construction being provided at suitable points in their length with conical grooves $s$, and the grooves adjacent to the ends receive rings J. These rings which are designed to hold the rollers upon the spindle are notched at points $t$, so as to take into the conical grooves $s$, and prevent the rollers from any undue movement. By the employment of these rollers, it will be seen that a very effective anti-friction bearing is provided for circular movement; the rings will serve to hold the rollers against the spindle in proper positions and the grooves in the roller being arranged at certain distances, will serve to collect any grit or dust that might enter the bearings and will also serve materially in reducing the friction, and consequently the heat.

While I have illustrated my improvements on a wagon wheel or hub thereof, there are many other uses to which the improvements might be applied, as for instance, bicycles, car axles, and other parts of machinery.

Having described my invention, what I claim is—

The combination with a shaft or spindle having the collar $a$, provided in its inner side with the annular groove and also having the external threads at one end; of a sleeve surrounding the shaft or spindle and having internal threads at its opposite ends, the box section $d$, serving in conjunction with the collar $a$, to form an inner box C, and having the externally threaded extension $g$, engaging the internal threads of the sleeve and also having an annular groove in its side contiguous to the collar $a$, the nut $l$, having a threaded aperture to receive the threaded end of the spindle and also having an annular groove in its inner side, the box section $h$, serving in conjunction with the nut $l$, to form an outer box D, and having the externally threaded extension $k$, engaging the internal threads of the sleeve and also having an annular groove in its side contiguous to the nut $l$, balls interposed between the collar $a$, and the section $d$, of the box C, and between the section $h$, and nut $l$, of the box D, rollers interposed between the spindle or shaft and the sleeve and resting between the extensions $g$, and $k$, of the box sections $d$, and $h$, and rings J, surrounding the said rollers, substantially as and for the purpose specified.

In testimony whereof I affix my signature in presence of witnesses.

GEORGE J. CLINE.

Witnesses:
WILSON ROOSE,
ALBERT BERKEY,
GEO. A. CULP.